US012774108B2

(12) United States Patent
Clark et al.

(10) Patent No.: US 12,774,108 B2
(45) Date of Patent: Oct. 27, 2026

(54) AIRCRAFT HEAT EXCHANGE SYSTEM WITH MULTIPLE HEAT EXCHANGERS

(71) Applicant: RTX Corporation, Farmington, CT (US)

(72) Inventors: Thomas E. Clark, Wells, ME (US); Murat Yazici, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/980,849

(22) Filed: Dec. 13, 2024

(65) Prior Publication Data

US 2026/0167342 A1 Jun. 18, 2026

(51) Int. Cl.
*B64D 33/08* (2006.01)
*F01D 15/10* (2006.01)
*H02K 9/00* (2006.01)

(52) U.S. Cl.
CPC ............ *B64D 33/08* (2013.01); *F01D 15/10* (2013.01); *H02K 9/00* (2013.01); *F05D 2220/323* (2013.01); *F05D 2220/76* (2013.01); *F05D 2260/213* (2013.01)

(58) Field of Classification Search
CPC .......... B64D 33/08; F01D 15/10; H02K 9/00; F05D 2220/323; F05D 2220/76; F05D 2260/213
See application file for complete search history.

(56) References Cited

U.S. PATENT DOCUMENTS 5,123,242 A * 6/1992 Miller .................... F28F 27/02 60/39.83
5,203,163 A * 4/1993 Parsons .................... F02C 6/08 60/785
8,826,641 B2 * 9/2014 Suciu .................... F02C 7/224 60/266
8,904,753 B2 * 12/2014 Murphy .................... F02C 7/185 165/96
9,234,481 B2 * 1/2016 Suciu .................... F02C 7/224
10,196,932 B2 * 2/2019 Sennoun .................... F02K 3/115
10,443,620 B2 * 10/2019 Hoefler .................... F04D 19/002
(Continued)

OTHER PUBLICATIONS

EP Search Report for EP Patent Application No. 25223455.4 dated Aug. 17, 2026.

*Primary Examiner* — Jesse S Bogue
(74) *Attorney, Agent, or Firm* — Getz Balich LLC

(57) ABSTRACT

A vane structure includes a structure passage that extends internally from a passage inlet to a passage outlet. The passage inlet fluidly couples the structure passage to an external environment outside of the vane structure. The first heat exchanger is disposed within the vane structure along the structure passage between the passage inlet and the passage outlet. The second heat exchanger is disposed within the vane structure along the structure passage between the passage inlet and the passage outlet. The electric machine system includes a plurality of electric components including a first electric machine and a first electric machine controller for the first electric machine. The first electric machine is configurable as an electric motor and/or an electric generator. The first fluid circuit is configured to cool and/or lubricate a first of the electric components. The first fluid circuit includes the first heat exchanger and/or the second heat exchanger.

18 Claims, 8 Drawing Sheets

(56) References Cited

U.S. PATENT DOCUMENTS

| | | | | |
|---|---|---|---|---|
| 10,563,582 | B2 * | 2/2020 | Duesler | F28D 1/05333 |
| 10,794,288 | B2 * | 10/2020 | Schwarz | F02K 3/06 |
| 11,105,340 | B2 * | 8/2021 | Cheung | B64D 27/20 |
| 12,049,847 | B2 * | 7/2024 | Diaz | F01D 25/14 |
| 12,123,350 | B2 | 10/2024 | Niergarth | |
| 12,618,337 | B1 * | 5/2026 | Clark | F01D 25/12 |
| 2008/0006396 | A1 * | 1/2008 | Upadhya | F28F 9/262 165/165 |
| 2008/0028763 | A1 * | 2/2008 | Schwarz | F02K 1/1207 60/771 |
| 2018/0051702 | A1 * | 2/2018 | Kupiszewski | B64D 33/00 |
| 2018/0162537 | A1 * | 6/2018 | Schwarz | H02K 7/1823 |
| 2019/0145316 | A1 * | 5/2019 | Schwarz | F02K 3/04 60/728 |
| 2019/0383568 | A1 * | 12/2019 | Schoell | F28F 19/006 |
| 2020/0300164 | A1 | 9/2020 | Muldoon | |
| 2025/0326492 | A1 * | 10/2025 | Clark | F01D 15/10 |
| 2026/0104007 | A1 * | 4/2026 | Clark | F02C 7/042 |

* cited by examiner

AIRCRAFT HEAT EXCHANGE SYSTEM WITH MULTIPLE HEAT EXCHANGERS

BACKGROUND OF THE DISCLOSURE

1. Technical Field

This disclosure relates generally to an aircraft powerplant and, more particularly, to a heat exchange system for the aircraft powerplant.

2. Background Information

An aircraft powerplant such as a turbofan propulsion system typically includes multiple heat exchange systems. Various types and configurations of heat exchange systems are known in the art. While these known heat exchange systems have various benefits, there is still room in the art for improvement.

SUMMARY OF THE DISCLOSURE

According to an aspect of the present disclosure, an assembly is provided for an aircraft powerplant. This assembly includes a vane structure, a first heat exchanger, a second heat exchanger, an electric machine system and a first fluid circuit. The vane structure includes a structure passage that extends internally within the vane structure from a passage inlet into the structure passage to a passage outlet out from the structure passage. The passage inlet fluidly couples the structure passage to an external environment outside of the vane structure. The first heat exchanger is disposed within the vane structure along the structure passage between the passage inlet and the passage outlet. The second heat exchanger is disposed within the vane structure along the structure passage between the passage inlet and the passage outlet. The electric machine system includes a plurality of electric components. The electric components include a first electric machine and a first electric machine controller configured to control operation of the first electric machine. The first electric machine is configurable as an electric motor and/or an electric generator. The first fluid circuit is configured to cool and/or lubricate at least a first of the electric components. The first fluid circuit includes the first heat exchanger and/or the second heat exchanger.

According to another aspect of the present disclosure, another assembly is provided for an aircraft powerplant. This assembly includes an engine core, a bypass flowpath, a bifurcation structure, a first heat exchanger, a second heat exchanger and a flow diverter. The engine core includes a compressor section, a combustor section and a turbine section. The bypass flowpath is disposed outside of the engine core. The bifurcation structure extends radially across the bypass flowpath. The bifurcation structure includes a structure passage that extends through the bifurcation structure from a passage inlet into the structure passage to a passage outlet out from the structure passage. The passage inlet fluidly couples the structure passage to the bypass flowpath. The first heat exchanger is disposed within the bifurcation structure along the structure passage between the passage inlet and the passage outlet. The second heat exchanger is disposed within the bifurcation structure along the structure passage between the passage inlet and the passage outlet. The flow diverter is upstream of the first heat exchanger and the second heat exchanger along the structure passage. The flow diverter is configured to selectively divert airflow to the first heat exchanger and/or the second heat exchanger.

According to still another aspect of the present disclosure, another assembly is provided for an aircraft powerplant. This assembly includes an engine core, a bypass flowpath, a bifurcation structure, a first heat exchanger and a second heat exchanger. The engine core includes a compressor section, a combustor section and a turbine section. The bypass flowpath is disposed outside of the engine core. The bifurcation structure extends radially across the bypass flowpath. The bifurcation structure includes a structure passage that extends through the bifurcation structure from a passage inlet into the structure passage to a passage outlet out from the structure passage. The passage inlet fluidly couples the structure passage to the bypass flowpath. The first heat exchanger is disposed within the bifurcation structure along the structure passage between the passage inlet and the passage outlet. The second heat exchanger is disposed within the bifurcation structure along the structure passage between the first heat exchanger and the passage outlet. The structure passage is configured such that at least substantially all air flowing through the second heat exchanger is received from the first heat exchanger.

The assembly may also include a plurality of electric components and a first fluid circuit. The first fluid circuit may be configured to service at least a first of the electric components. The first fluid circuit may include the first heat exchanger and/or the second heat exchanger.

The flow diverter may be disposed at a location within the bifurcation structure radially between the first heat exchanger and the second heat exchanger.

The assembly may also include an electric machine system and a first fluid circuit. The electric machine system may include a plurality of electric components. The electric components may include a first electric machine and a first electric machine controller electrically coupled to the first electric machine. The first fluid circuit may be configured to cool and/or lubricate at least a first of the electric components. The first fluid circuit may include the first heat exchanger and/or the second heat exchanger.

The assembly may also include an engine core and a bypass flowpath. The engine core may include a rotating structure, a compressor section, a combustor section and a turbine section. The rotating structure may include a bladed rotor disposed in the compressor section or the turbine section. The rotating structure may be operatively coupled to a rotor of the first electric machine. The bypass flowpath may be disposed outside of the engine core and may comprise the external environment. The vane structure may be configured as a bifurcation structure extending radially across the bypass flowpath.

The passage inlet may be disposed at a leading edge of the vane structure in the external environment.

The passage outlet may be disposed at a trailing edge of the vane structure.

The passage outlet may also fluidly couple the structure passage to the external environment.

The first heat exchanger and the second heat exchanger may be arranged in series along the structure passage between the passage inlet and the passage outlet.

The first heat exchanger may be upstream of the second heat exchanger along the structure passage between the passage inlet and the passage outlet. The assembly may be configured such that all air flowing along the structure passage through the first heat exchanger is received by the second heat exchanger.

The first heat exchanger may be upstream of the second heat exchanger along the structure passage between the passage inlet and the passage outlet. The assembly may be configured such that all air flowing along the structure passage through the second heat exchanger is received from the first heat exchanger.

The first heat exchanger and the second heat exchanger may be arranged in parallel along the structure passage between the passage inlet and the passage outlet.

The assembly may also include a flow regulator upstream of the first heat exchanger and the second heat exchanger along the structure passage. The flow regulator may be configured to regulate airflow through the first heat exchanger and/or the second heat exchanger.

The assembly may also include a flow regulator downstream of the first heat exchanger and the second heat exchanger along the structure passage. The flow regulator may be configured to regulate airflow through the first heat exchanger and/or the second heat exchanger.

The assembly may also include one or more flow regulators configured to direct equal airflow through the first heat exchanger and the second heat exchanger.

The assembly may also include one or more flow regulators configured to: bias more airflow through the first heat exchanger than through the second heat exchanger during a first mode; and/or bias more of the airflow through the second heat exchanger than through the first heat exchanger during a second mode.

The first fluid circuit may include the first heat exchanger and the second heat exchanger.

The assembly may also include a second fluid circuit discrete from the first fluid circuit. The first fluid circuit may include the first heat exchanger. The second fluid circuit may include the second heat exchanger.

The second fluid circuit may be configured to cool and/or lubricate one or more powerplant components independent of the electric machine system.

The aircraft powerplant may be configured as or otherwise include a turbofan propulsion system.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
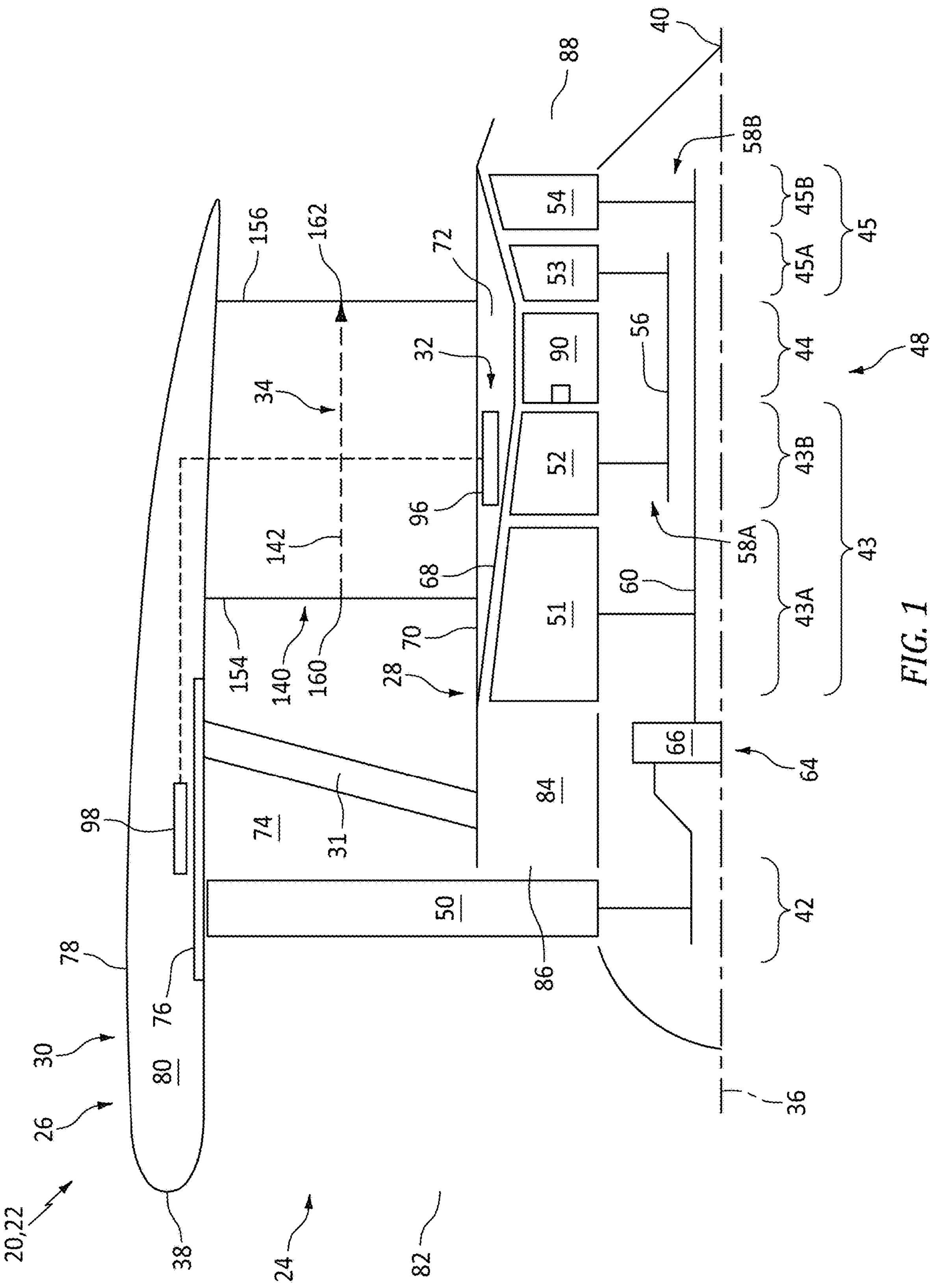
FIG. 1 is a partial schematic illustration of an aircraft propulsion system.

FIG. 1 illustrates a powerplant 20 for an aircraft. The aircraft may be an airplane, a rotorcraft (e.g., a helicopter), a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as any type of ducted and/or open rotor propulsion system with, for example, a vane structure (e.g., a bifurcation structure) into which a plurality of heat exchangers may be arranged as described below. Moreover, the aircraft powerplant 20 is not limited to propulsion system applications. The aircraft powerplant 20, for example, may alternatively (or also) be configured as an electrical power system for the aircraft; e.g., an auxiliary power unit (APU).

The aircraft propulsion system 22 includes a gas turbine engine 24 (e.g., a turbofan engine) housed within a stationary propulsion system housing 26, which propulsion system housing 26 of FIG. 1 includes an inner housing structure 28, an outer housing structure 30 and a guide vane structure 31 (e.g., a fan exit guide vane (FEGV) structure) extending radially between and connected to the inner housing structure 28 and the outer housing structure 30. The aircraft propulsion system 22 also includes an electric machine system 32 (see also FIG. 2) and a working fluid system 34 (see also FIG. 3). The aircraft propulsion system 22 extends axially along an axis 36 between an axial forward, upstream end 38 of the aircraft propulsion system 22 and an axial aft, downstream end 40 of the aircraft propulsion system 22. Briefly, the propulsion system axis 36 may be a centerline axis of the aircraft propulsion system 22, the turbine engine 24 and/or one or more of its members. The propulsion system axis 36 may also or alternatively be a rotational axis for one or more members of the turbine engine 24.

The aircraft propulsion system 22 and its turbine engine 24 of FIG. 1 include a propulsor section 42 (e.g., a fan section), a compressor section 43, a combustor section 44 and a turbine section 45. The compressor section 43 of FIG. 1 includes a low pressure compressor (LPC) section 43A and a high pressure compressor (HPC) section 43B. The turbine section 45 of FIG. 1 includes a high pressure turbine (HPT) section 45A and a low pressure turbine (LPT) section 45B. Here, at least (or only) the LPC section 43A, the HPC section 43B, the combustor section 44, the HPT section 45A and the LPT section 45B collectively form a core 48 of the turbine engine 24.

The engine sections 42-45B may be arranged sequentially along the propulsion system axis 36 within the propulsion system housing 26. The propulsor section 42 includes a bladed propulsor rotor 50; e.g., a fan rotor. The LPC section 43A includes a bladed low pressure compressor (LPC) rotor 51. The HPC section 43B includes a bladed high pressure compressor (HPC) rotor 52. The HPT section 45A includes a bladed high pressure turbine (HPT) rotor 53. The LPT section 45B includes a bladed low pressure turbine (LPT) rotor 54.

The HPC rotor 52 is coupled to and rotatable with the HPT rotor 53. The HPC rotor 52 of FIG. 1, for example, is connected to the HPT rotor 53 through a high speed shaft 56. At least (or only) the HPC rotor 52, the HPT rotor 53 and the high speed shaft 56 collectively form a high speed rotating structure 58A; e.g., a high speed spool of the engine core 48. This high speed rotating structure 58A of FIG. 1 and its members 52, 53 and 56 are rotatable about the propulsion system axis 36. However, it is contemplated the high speed rotating structure 58A may alternatively be rotatable about another axis radially and/or angularly offset from the rotational axis of the propulsor rotor 50 and/or the centerline axis of the turbine engine 24.

The LPC rotor 51 is coupled to and rotatable with the LPT rotor 54. The LPC rotor 51 of FIG. 1, for example, is connected to the LPT rotor 54 through a low speed shaft 60. At least (or only) the LPC rotor 51, the LPT rotor 54 and the low speed shaft 60 collectively form a low speed rotating structure 58B; e.g., a low speed spool of the engine core 48. This low speed rotating structure 58B is further coupled to the propulsor rotor 50 through a drivetrain 64. The drivetrain 64 may be configured as a geared drivetrain, where a geartrain 66 (e.g., a transmission, a speed change device, an epicyclic geartrain, etc.) is disposed between and operatively couples the propulsor rotor 50 to the low speed rotating structure 58B and its LPT rotor 54. With this arrangement, the propulsor rotor 50 may rotate at a different (e.g., slower) rotational speed than the low speed rotating structure 58B and its LPT rotor 54. Alternatively, the drivetrain 64 may be configured as a direct drive drivetrain, where the geartrain 66 is omitted. With such an arrangement, the propulsor rotor 50 rotates at a common (the same) rotational speed as the low speed rotating structure 58B and its LPT rotor 54. The low speed rotating structure 58B of FIG. 1 and its members 51, 54 and 60 as well as the propulsor rotor 50 are rotatable about the propulsion system axis 36. However, it is contemplated the low speed rotating structure 58B may alternatively be rotatable about another axis radially and/or angularly offset from the rotational axis of the propulsor rotor 50 and/or the centerline axis of the turbine engine 24.

The inner housing structure 28 of FIG. 1 includes an inner case 68 (e.g., a core case) for the turbine engine 24, an inner nacelle structure 70 (sometimes referred to as an inner fixed structure (IFS)) and an internal inner housing compartment 72. The inner case 68 is disposed radially outboard of, extends axially along and may circumscribe one or more or all of the engine sections 43A-45B and their respective engine rotors 51-54. The inner case 68 may thereby house and provide a support structure for the respective engine sections 43A-45B and their respective engine rotors 51-54. The inner nacelle structure 70 is configured to provide an aerodynamic cover over the engine core 48 and its inner case 68. The inner housing compartment 72 of FIG. 1 is formed by and is disposed radially between the inner case 68 and an inner barrel of the inner nacelle structure 70. The inner housing structure 28 and its inner nacelle structure 70 may also form a radial inner peripheral boundary of a (e.g., annular) bypass flowpath 74 within the aircraft propulsion system 22.

The outer housing structure 30 of FIG. 1 includes an outer case 76 (e.g., a fan case) for the turbine engine 24, an outer nacelle structure 78 and an internal outer housing compartment 80. The outer case 76 is disposed radially outboard of, extends axially along and may circumscribe the propulsor section 42 and its propulsor rotor 50. The outer case 76 may thereby house and provide a containment structure for the propulsor section 42 and its propulsor rotor 50. The outer nacelle structure 78 is configured to provide an aerodynamic cover over the outer case 76. The outer housing compartment 80 of FIG. 1 is at least partially formed by and disposed radially between the outer case 76 and an outer portion (e.g., fan cowls) of the outer nacelle structure 78. The outer housing structure 30 and its outer nacelle structure 78 may also form a radial outer peripheral boundary of the bypass flowpath 74.

During operation, ambient air from outside of the aircraft enters the aircraft propulsion system 22 and its turbine engine 24 through an airflow inlet 82. This air is directed across the propulsor section 42 and into a (e.g., annular) core flowpath 84 and the bypass flowpath 74. The core flowpath 84 of FIG. 1 extends sequentially through the LPC section 43A, the HPC section 43B, the combustor section 44, the HPT section 45A and the LPT section 45B from an airflow inlet 86 into the core flowpath 84 to a combustion products exhaust 88 out from the core flowpath 84 and the engine core 48. The air entering the core flowpath 84 may be referred to as "core air". The bypass flowpath 74 extends through a bypass duct, which bypass flowpath 74 and bypass duct bypass (e.g., are disposed radially outboard of and extend along) the engine core 48 and the inner housing structure 28. The air within the bypass flowpath 74 may be referred to as "bypass air".

The core air is compressed by the LPC rotor 51 and the HPC rotor 52 and is directed into a (e.g., annular) combustion chamber 90 of a (e.g., annular) combustor 92 in the combustor section 44. Fuel is injected into the combustion chamber 90 by one or more fuel injectors and mixed with the compressed core air to provide a fuel-air mixture. This fuel-air mixture is ignited and combustion products thereof flow through and sequentially drive rotation of the HPT rotor 53 and the LPT rotor 54 about the propulsion system axis 36. The rotation of the HPT rotor 53 and the LPT rotor 54 respectively drive rotation of the HPC rotor 52 and the LPC rotor 51 about the propulsion system axis 36 and, thus, compression of the air received from the core inlet 86. The rotation of the LPT rotor 54 also drives rotation of the propulsor rotor 50. The rotation of the propulsor rotor 50 propels the bypass air through and out of the bypass flowpath 74. The propulsion of the bypass air may account for a majority of thrust generated by the turbine engine 24 of FIG. 1. Briefly, within the bypass flowpath 74, the guide vane structure 31 conditions (e.g., straightens out, de-swirls, etc.) the flow of bypass air propelled by the propulsor rotor 50 to enhance the forward thrust.

Figure 2:
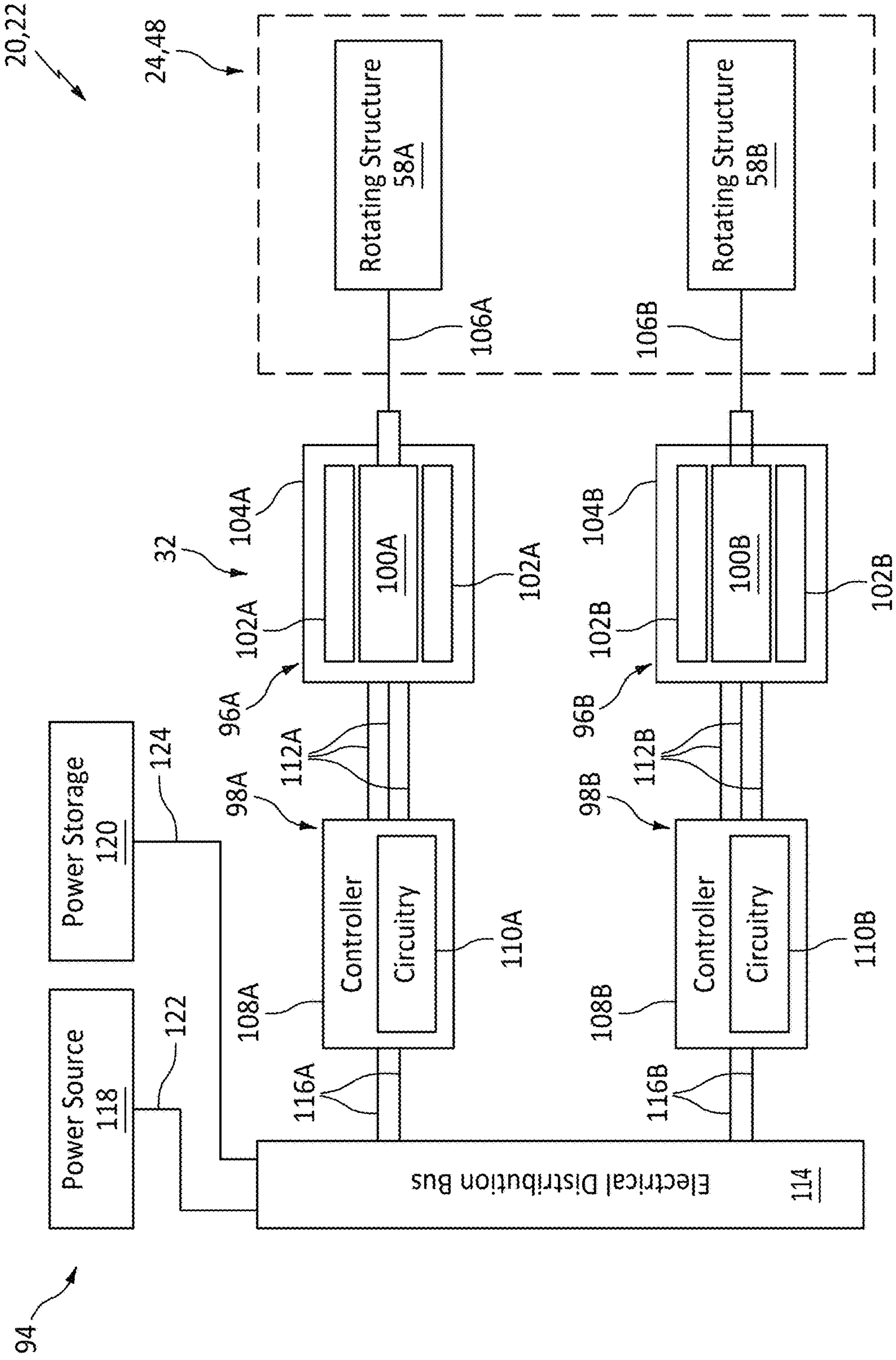
FIG. 2 is a schematic illustration of a portion of the aircraft propulsion system at an electric machine system.

Referring to FIG. 2, the electric machine system 32 is electrically coupled to an electrical system 94 for the aircraft. The electric machine system 32 of FIG. 2 includes one or more electric machines 96A and 96B (generally referred to as "96") and one or more electric machine (EM) controllers 98A and 98B (generally referred to as "98"). For ease of description, each electric machine 96 of FIG. 2 is described below as being electrically coupled to, controlled by and/or otherwise associated with a single, dedicated one of the EM controllers 98. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with one or more common electric machines.

Each electric machine 96A, 96B of FIG. 2 includes an electric machine rotor 100A, 100B (generally referred to as "100"), an electric machine stator 102A, 102B (generally referred to as "102") and an electric machine housing 104A, 104B (generally referred to as "104"). The machine rotor 100 is rotatable about a rotational axis of the machine rotor 100, which rotational axis may also be an axial centerline of the electric machine 96. The machine stator 102 of FIG. 2 is radially outboard of and circumscribes the machine rotor 100. With this arrangement, each electric machine 96 is configured as a radial flux electric machine. The electric machines 96 of the present disclosure, however, are not limited to such an exemplary rotor-stator configuration nor to radial flux arrangements. The machine rotor 100, for example, may alternatively be radially outboard of and circumscribe the machine stator 102. In another example, the machine rotor 100 may be axially next to the machine stator 102 configuring the respective electric machine 96 as an axial flux electric machine. Referring again to FIG. 2, the machine rotor 100 and the machine stator 102 are at least partially or completely housed within the machine housing 104.

Each electric machine 96A, 96B may be operatively coupled to a respective one of the engine rotating structures 58A, 58B (generally referred to as "58"). Each machine rotor 100 of FIG. 2, for example, is mechanically coupled to and rotatable with the respective engine rotating structure 58 through a drivetrain 106A, 106B (generally referred to as "106"). This drivetrain 106 may be configured as or otherwise include a shaft, a tower shaft assembly, a gearbox, and/or the like. For ease of description, each machine rotor 100 of FIG. 2 is described below as being coupled to and rotatable with a unique one of the engine rotating structures 58 of the turbine engine 24. However, it is contemplated multiple machine rotors may alternatively be coupled to and rotatable with a common engine rotating structure 58. It is also contemplated a single one of the machine rotors may be coupled to and rotatable with multiple engine rotating structures, directly or through another device such as a differential or a clutch system. In addition, while the electric machines 96 are described above as being coupled to the engine rotating structures 58, it is contemplated the machine rotor 100 of one or more of the electric machines 96 may alternatively be operatively coupled to another rotating device through the drivetrain 106 such as, but not limited to, a pump rotor, an auxiliary compressor rotor, an actuator rotor, or the like.

Each electric machine 96 of FIG. 2 may be configurable as an electric motor and/or an electric generator; e.g., an electric motor-generator. For example, during a motor mode of operation, a respective electric machine 96 may operate as the electric motor to convert electricity received from the aircraft electrical system 94. The machine stator 102, for example, may generate an electromagnetic field with the machine rotor 100 using a current of electricity received from the aircraft electrical system 94 through the respective EM controller 98. This electromagnetic field may drive rotation of the machine rotor 100. The machine rotor 100, in turn, may provide mechanical power to and drive rotation of the respective engine rotating structure 58 through the respective drivetrain 106. This mechanical power may be provided to boost power or completely power the rotation of the respective engine rotating structure 58. By contrast, during a generator mode of operation, the electric machine 96 may operate as the electric generator to convert mechanical power received from the respective engine rotating structure 58 into electricity. Rotation of the machine rotor 100, for example, may be rotationally driven by rotation of the respective engine rotating structure 58 through the respective drivetrain 106. The rotation of the machine rotor 100 may generate an electromagnetic field with the machine stator 102, and the machine stator 102 may convert energy from the electromagnetic field into electricity. The respective electric machine 96 may then provide a current of electricity to the aircraft electrical system 94 through the respective EM controller 98 for storage and/or further use. The electric machines 96 of the present disclosure, however, are not limited to such exemplary operation. For example, one, some or all of the electric machines 96 may alternatively each be configured as a dedicated electric generator; e.g., without the electric motor functionality. One, some or all of the electric machines 96 may alternatively each be configured as a dedicated electric motor; e.g., without the electric generator functionality.

Each EM controller 98 includes a controller housing 108A, 108B (generally referred to as "108") and internal controller circuitry 110A, 110B (generally referred to as "110"). The controller housing 108 may be configured as an enclosed case (e.g., a closed or sealed container) for the respective controller circuitry 110. The controller circuitry 110 is disposed within an interior of the controller housing 108; e.g., an internal chamber or other volume(s) within and enclosed by the controller housing 108. The controller circuitry 110 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), processing device(s), memory module(s), communication module(s), electrical transformer(s), electrical rectifier(s), transformer(s), and/or the like.

Each EM controller 98 is electrically coupled to a respective one of the electric machines 96 through one or more electric cables 112A, 112B (generally referred to as "112"); e.g., high voltage electric cables, power feeder cables, etc. More particularly, the controller circuitry 110 of each EM controller 98 is electrically coupled to the respective electric machine 96 and its machine stator 102 through the respective electric cables 112. Similarly, each EM controller 98 is electrically coupled to an electrical distribution bus 114 of the aircraft electrical system 94 through one or more electric cables 116A, 116B (generally referred to as "116"); e.g., high voltage electric cables, power feeder cables, etc. More particularly, the controller circuitry 110 of each EM controller 98 is electrically coupled to the aircraft electrical system 94 and its electrical distribution bus 114 through the respective electric cables 116.

Each EM controller 98 and its controller circuitry 110 are configured to control operation of a respective one of the electric machines 96. For example, when operating as the electric motor, the respective EM controller 98 and its controller circuitry 110 are configured to regulate a flow of electricity from the aircraft electrical system 94 to the respective electric machine 96. This electricity flow regulation may include: (a) turning-on the flow of electricity from the aircraft electrical system 94 to the respective electric machine 96 (e.g., electrically coupling the respective electric machine 96 to the aircraft electrical system 94); (b) turning-off the flow of electricity from the aircraft electrical system 94 to the respective electric machine 96 (e.g., electrically decoupling the respective electric machine 96 from the aircraft electrical system 94); (c) moderating the flow of electricity from the aircraft electrical system 94 to the respective electric machine 96. Here, the respective EM controller 98 operates as a motor controller. In another example, when operating as the electric generator, the respective EM controller 98 and its controller circuitry 110 are configured to regulate a flow of electricity from the respective electric machine 96 to the aircraft electrical system 94. This electricity flow regulation may include: (a) turning-on the flow of electricity from the respective electric machine 96 to the aircraft electrical system 94 (e.g., electrically coupling the respective electric machine 96 to the aircraft electrical system 94); (b) turning-off the flow of electricity from the respective electric machine 96 to the aircraft electrical system 94 (e.g., electrically decoupling the respective electric machine 96 from the aircraft electrical system 94); (c) moderating the flow of electricity from the respective electric machine 96 to the aircraft electrical system 94. Here, the respective EM controller 98 operates as a generator controller.

The aircraft electrical system 94 includes the electrical distribution bus 114. This aircraft electrical system 94 may also include a power source 118 and/or a power storage 120. The electrical distribution bus 114 is electrically coupled to each of the electric machines 96 through their respective EM controllers 98. The electrical distribution bus 114 is also electrically coupled to the power source 118 and the power storage 120, schematically shown via 122 and 124. Of course, the electrical distribution bus 114 may also be electrically coupled to one or more additional electric components of the aircraft propulsion system 22 and/or one or more additional electric components of the aircraft outside of the aircraft propulsion system 22; e.g., airframe mounted electric components, etc. With this arrangement, the electrical distribution bus 114 provides an intermediate connection between the various electrical members (e.g., 98A, 98B, 118 and 120). The power source 118 may be an electric generator powered by the turbine engine 24 (see FIG. 1) or an electric generator powered by another aircraft powerplant; e.g., an engine of a companion aircraft propulsion system, an engine of an auxiliary power unit (APU), a fuel cell system, etc. The power storage 120 is configured to receive electricity from the electrical distribution bus 114 for storage. The power storage 120 is also configured to provide the stored electricity to the electrical distribution bus 114. The power storage 120, for example, may be configured as or otherwise include one or more electricity storage devices; e.g., batteries, super capacitors, etc. Of course, it is contemplated one of the electric machines 96 (e.g., operating as the electric generator) may also or alternatively operate as a power source for another one of the electric machines 96 (e.g., operating as the electric motor).

Figure 3:
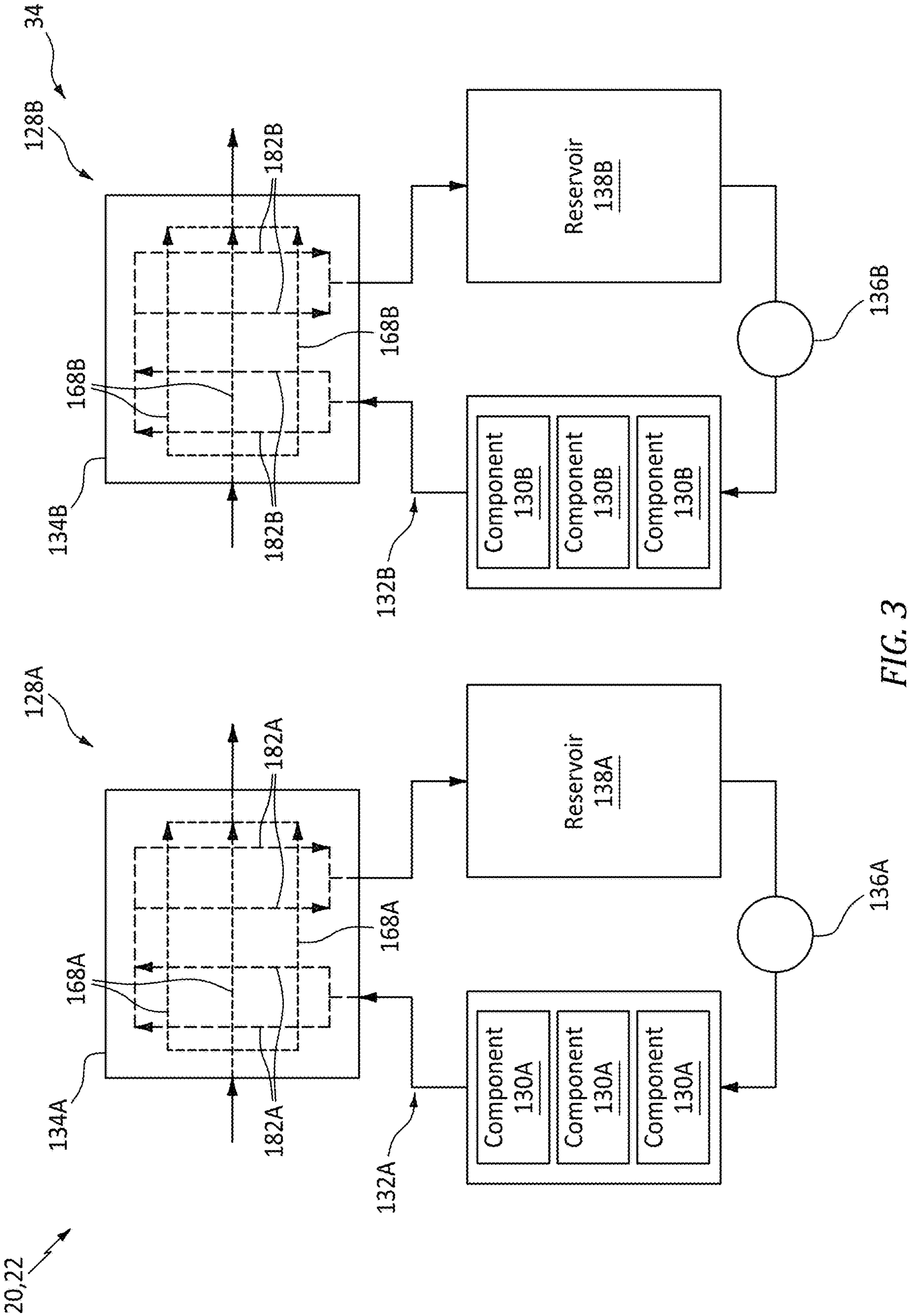
FIG. 3 is a schematic illustration of a portion of the aircraft propulsion system at a working fluid system with dual fluid circuits.

Referring to FIG. 3, the working fluid system 34 may be configured as a heat exchange and/or lubrication system for various components of the aircraft propulsion system 22. The working fluid system 34 of FIG. 3, for example, includes a plurality of discrete fluid circuits 128A and 128B (generally referred to as "128"); e.g., fluidly decoupled fluid circuits. Each of these fluid circuits 128A, 128B may be configured to service (e.g., cool and/or lubricate) a discrete set of one or more propulsion system components 130A, 130B (generally referred to as "130"). For ease of description, the first propulsion system components 130A may be described as being various electric components including at least (or only) any one or more or all of the electric machine system members 96A, 96B, 98A and 98B (see FIG. 2). The second propulsion system components 130B may be described as being various turbine engine components including at least (or only) one or more engine bearings, the geartrain 66 (see FIG. 1), component(s) of the drivetrain(s) 106 (see FIG. 2), lubricated seal member(s), engine heat exchanger(s), etc. The present disclosure, however, is not limited to such an exemplary component arrangement nor such exemplary component types as described below in further detail.

Each fluid circuit 128A, 128B of FIG. 3 includes a circuit path 132A, 132B (generally referred to as "132"). Each fluid circuit 128A, 128B also includes a heat exchanger 134A, 134B (generally referred to as "134"), a working fluid flow regulator 136A, 136B (generally referred to as "136"; e.g., a pump) and a working fluid reservoir 138A, 138B (generally referred to as "138"; e.g., a tank). Briefly, these circuit components 130, 134, 138 and 136 are arranged inline along the respective circuit path 132. The circuit path 132 of FIG. 3 thereby extends serially through the respective circuit component 130, 134, 138 and 136. The circuit path 132 of FIG. 3 is also fluidly coupled to and may extend in series or in parallel through the respective propulsion system components 130 serviced by the respective fluid circuit 128. Note, while each propulsion system component 130 is shown as being upstream of the respective heat exchanger 134 along the respective circuit path 132, it is contemplated one or more or all of the propulsion system components 130 may alternatively be downstream of the respective heat exchanger 134 along the respective circuit path 132. Moreover, it is contemplated each fluid circuit 128 may include various additional components (not shown) arranged along the circuit path 132 such as filter(s), sensor(s), additional heat exchanger(s), additional component(s), valve(s), pump(s), etc. The present disclosure therefore is not limited to the exemplary fluid circuit arrangements shown in FIG. 3.

Figure 4:
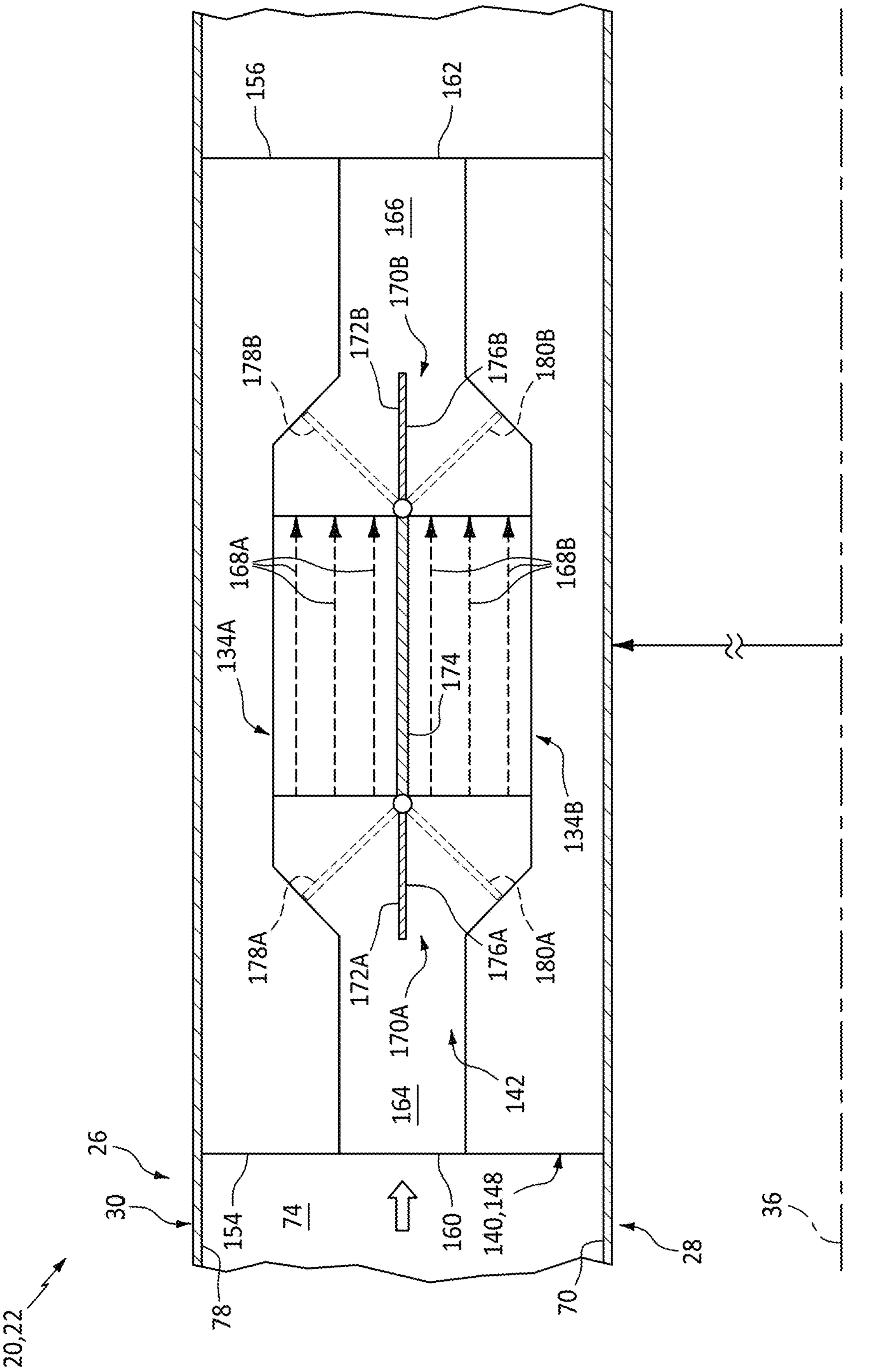
FIG. 4 is a schematic sectional illustration of a portion of the aircraft propulsion system at a vane structure with a parallel arrangement of internal heat exchangers.
Figure 6:
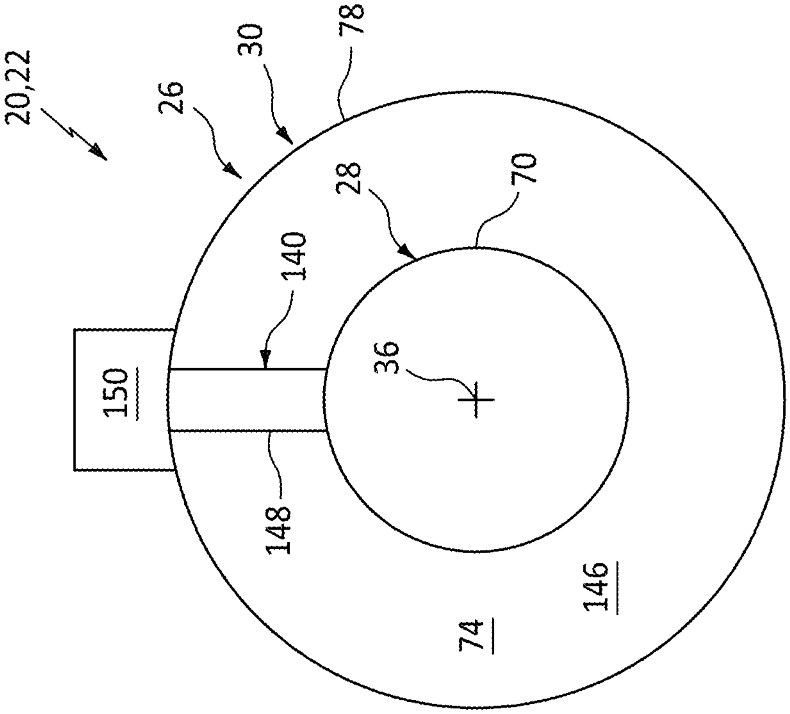
FIG. 6 is a schematic cross-sectional illustration of the aircraft propulsion system with a single bifurcation structure.
Figure 5:
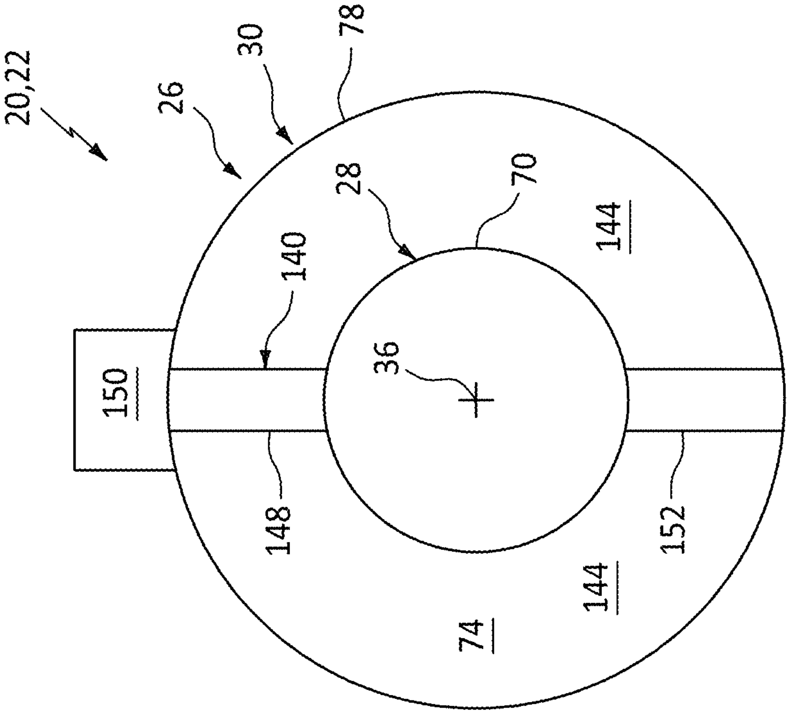
FIG. 5 is a schematic cross-sectional illustration of the aircraft propulsion system with multiple bifurcation structures.

Referring to FIG. 4, the heat exchangers 134 are arranged internally within a vane structure 140 of the aircraft propulsion system 22 along an internal structure passage 142. The vane structure 140 of FIG. 4 is configured as a nacelle bifurcation structure of the engine housing 26 (see also FIG. 1); e.g., an upper bifurcation structure. The vane structure 140 is disposed within the bypass flowpath 74. The vane structure 140 projects radially across the bypass flowpath 74 from the inner housing structure 28 to the outer housing structure 30. With such an arrangement, referring to FIGS. 5 and 6, the vane structure 140 may circumferentially bifurcate the bypass flowpath 74. For example, where the bypass duct has a D-duct arrangement as shown in FIG. 5, the vane structure 140 is disposed laterally (e.g., circumferentially or tangentially) between and separates two circumferential sections 144 of the bypass flowpath 74. In another example, where the bypass duct has an O-duct arrangement as shown in FIG. 6, the vane structure 140 is disposed laterally between and separates two circumferentially opposing sides of a circumferentially uninterrupted section 146 of the bypass flowpath 74. The vane structure 140 of FIGS. 5 and 6 is configured as an upper bifurcation structure 148. This upper bifurcation structure 148 may be circumferentially aligned with a pylon structure 150 for mounting the aircraft propulsion system 22 to an airframe component of the aircraft; e.g., a wing, etc. In other embodiments however, referring to FIG. 5, it is contemplated the vane structure 140 may alternatively be configured as a lower bifurcation structure 152. This lower bifurcation structure 152 is arranged circumferentially opposite the upper bifurcation structure 148 and/or the pylon structure 150. Here, the terms "upper" and "lower" describe a relative orientation of an object relative to a direction of gravity when, for example, the aircraft is on-ground or in substantially level flight. The present disclosure, however, is not limited to such exemplary arrangements. For example, where the aircraft propulsion system 22 is mounted to a side of an aircraft fuselage, a span of the vane structure 140 may extend horizontally rather than vertically as shown in FIGS. 5 and 6. Moreover, while the vane structure 140 is described herein as a nacelle bifurcation structure, it is contemplated the vane structure 140 may alternatively be configured as another type of vane of the aircraft propulsion system 22.

Figure 7A:
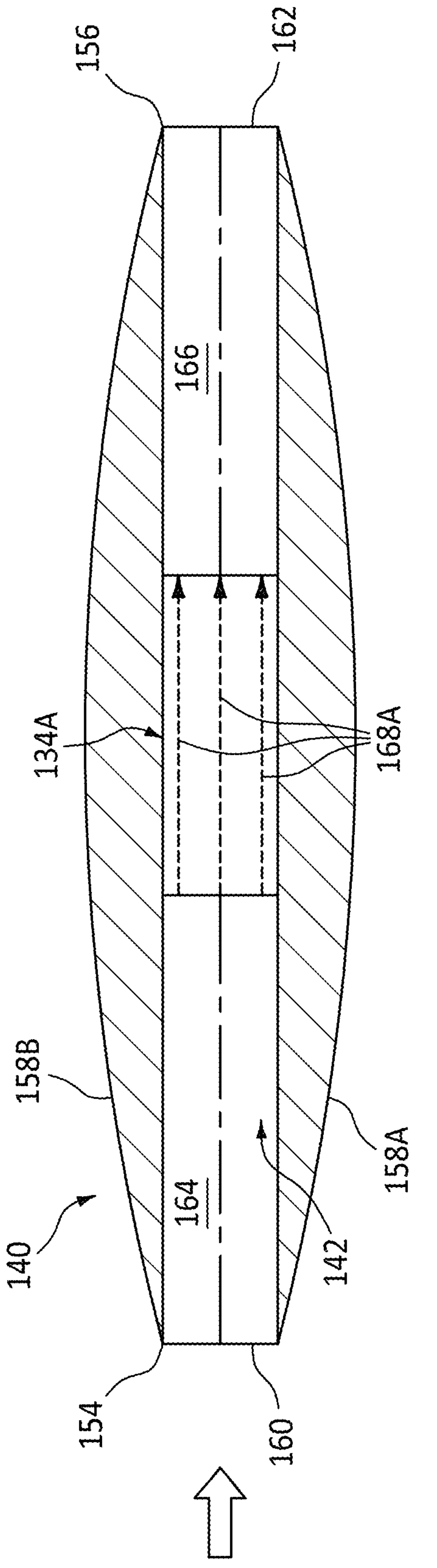
FIGS. 7A and 7B are schematic cross-sectional illustrations of the vane structure at various internal heat exchangers.
Figure 7B:
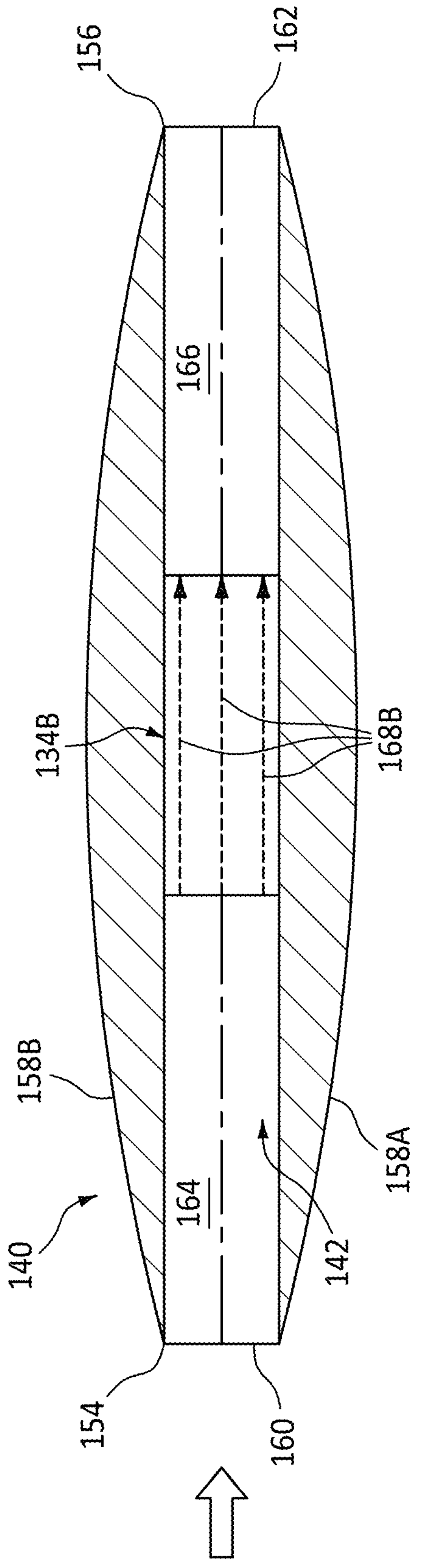

Referring to FIG. 4, the vane structure 140 extends radially across the bypass flowpath 74 (e.g., spanwise along a span of the vane structure 140) from the inner housing structure 28 and its inner nacelle structure 70 to the outer housing structure 30 and its outer nacelle structure 78. Here, the bypass flowpath 74 forms an environment external to the vane structure 140. The vane structure 140 is also connected to (e.g., fixed to) the inner housing structure 28 and the outer housing structure 30. The vane structure 140 extends longitudinally along a mean line (e.g., a chord line) of the vane structure 140 from a (e.g., forward, upstream) leading edge 154 of the vane structure 140 to a (e.g., aft, downstream) trailing edge 156 of the vane structure 140. The structure leading edge 154 of FIG. 4 is disposed in the bypass flowpath 74, and downstream of the guide vane structure 31 in FIG. 1. The structure trailing edge 156 of FIG. 4 is also disposed in the bypass flowpath 74. However, in other embodiments, the structure trailing edge 156 may alternatively be disposed outside of and downstream from the bypass flowpath 74 where, for example, the bifurcation structure transitions into a pylon nacelle for a portion of the pylon structure 150 outside of the propulsion system housing 26. Referring to FIGS. 7A and 7B, the vane structure 140 extends laterally between opposing lateral exterior sides 158A and 158B (generally referred to as "158") of the vane structure 140.

Referring to FIG. 4, the structure passage 142 extends internally within and through the vane structure 140 between an airflow inlet 160 (e.g., a single inlet orifice) into the structure passage 142 to an airflow outlet 162 (e.g., a single outlet orifice) out from the structure passage 142. The passage inlet 160 may be disposed at (e.g., on, adjacent or proximate) the structure leading edge 154. The passage outlet 162 may be disposed at the structure trailing edge 156. The structure passage 142 of FIG. 4 includes one or more sub-passages, which sub-passages of FIG. 4 include an inlet passage 164, an outlet passage 166, one or more internal first heat exchanger (HX) air passages 168A through and across the first heat exchanger 134A, and one or more internal second heat exchanger (HX) air passages 168B through and across the second heat exchanger 134B. The inlet passage 164 extends longitudinally in the vane structure 140 from the passage inlet 160 to an upstream intersection with the first HX air passages 168A and the second HX air passages 168B. The outlet passage 166 extends longitudinally in the vane structure 140 from a downstream intersection with the first HX air passages 168A and the second HX air passages 168B to the passage outlet 162. Each of the HX air passages 168 extends longitudinally through and may be partially or completely formed by the respective heat exchanger 134 from the inlet passage 164 at the upstream intersection to the outlet passage 166 at the downstream intersection. The first HX air passages 168A of FIG. 4 are also arranged in parallel with the second HX air passages 168B between the inlet passage 164 and the outlet passage 166. Moreover, the first HX air passages 168A may be arranged in parallel between the inlet passage 164 and the outlet passage 166, and the second HX air passages 168B may be arranged in parallel between the inlet passage 164 and the outlet passage 166.

The vane structure 140 and its structure passage 142 are configured with one or more internal flow regulators 170A and 170B (generally referred to as "170"); e.g., flow diverters. The upstream flow regulator 170A is disposed longitudinally next to and upstream of the heat exchangers 134 along the structure passage 142. The upstream flow regulator 170A of FIG. 4, for example, is disposed at the upstream intersection. The downstream flow regulator 170B is disposed longitudinally next to and downstream of the heat exchangers 134 along the structure passage 142. The downstream flow regulator 170B of FIG. 4, for example, is disposed at the downstream intersection.

The upstream flow regulator 170A is configured to selectively regulate airflow within the structure passage 142 to the first heat exchanger 134A and/or the second heat exchanger 134B. The upstream flow regulator 170A of FIG. 4, for example, includes an upstream regulator element 172A (e.g., a diverter panel) pivotally coupled to an intermediate wall 174 radially between the first heat exchanger 134A and the second heat exchanger 134B. This upstream regulator element 172A is configured to pivot or otherwise move about a pivot axis between an intermediate position (see 176A), an upper position (see 178A) and a lower position (see 180A) or anywhere in-between. In the intermediate position (see 176A), the upstream flow regulator 170A is configured to direct (e.g., equal) airflow from the inlet passage 164 into both (a) the first heat exchanger 134A and its first HX air passages 168A and (b) the second heat exchanger 134B and its second HX air passages 168B. In the upper position (see 178A), the upstream flow regulator 170A is configured to direct more airflow from the inlet passage 164 to (a) the second heat exchanger 134B and its second HX air passages 168B than to (b) the first heat exchanger 134A and its first HX air passages 168A. Moreover, it is contemplated the upstream regulator element 172A may be moved to completely block off airflow to the first heat exchanger 134A and its first HX air passages 168A. In the lower position (see 180A), the upstream flow regulator 170A is configured to direct more airflow from the inlet passage 164 to (a) the first heat exchanger 134A and its first HX air passages 168A than to (b) the second heat exchanger 134B and its second HX air passages 168B. Moreover, it is contemplated the upstream regulator element 172A may be moved to completely block off airflow to the second heat exchanger 134B and its second HX air passages 168B. The upstream flow regulator 170A may thereby tailor airflow to the first heat exchanger 134A and/or the second heat exchanger 134B based on circuit heat exchange requirements.

The downstream flow regulator 170B is configured to selectively regulate airflow within the structure passage 142 out from the first heat exchanger 134A and/or the second heat exchanger 134B. The downstream flow regulator 170B of FIG. 4, for example, includes a downstream regulator element 172B (e.g., a diverter panel) pivotally coupled to the intermediate wall 174 radially between the first heat exchanger 134A and the second heat exchanger 134B. This downstream regulator element 172B is configured to pivot or otherwise move about a pivot axis between an intermediate position (see 176B), an upper position (see 178B) and a lower position (see 180B) or anywhere in-between. In the intermediate position (see 176B), the downstream flow regulator 170B is configured to direct (e.g., equal) airflow from both (a) the first heat exchanger 134A and its first HX air passages 168A and (b) the second heat exchanger 134B and its second HX air passages 168B to the outlet passage 166. In the upper position (see 178B), the downstream flow regulator 170B is configured to direct more airflow from (a) the second heat exchanger 134B and its second HX air passages 168B to the outlet passage 166 than from (b) the first heat exchanger 134A and its first HX air passages 168A to the outlet passage 166. Moreover, it is contemplated the downstream regulator element 172B may be moved to completely block off airflow out of the first heat exchanger 134A and its first HX air passages 168A. In the lower position (see 180B), the downstream flow regulator 170B is configured to direct more airflow from (a) the first heat exchanger 134A and its first HX air passages 168A to the outlet passage 166 than from (b) the second heat exchanger 134B and its second HX air passages 168B to the outlet passage 166. Moreover, it is contemplated the downstream regulator element 172B may be moved to completely block off airflow out of the second heat exchanger 134B and its second HX air passages 168B. The downstream flow regulator 170B may thereby further tailor airflow to the first heat exchanger 134A and/or the second heat exchanger 134B based on circuit heat exchange requirements.

Referring to FIG. 4, each heat exchanger 134 is fluidly coupled with the structure passage 142 inline between the inlet passage 164 and the outlet passage 166 as described above. Referring to FIG. 3, each heat exchanger 134 is also fluidly coupled inline along a respective one of the fluid circuits 128 and its circuit path 132. In particular, in addition to including the respective HX air passages 168, each heat exchanger 134 also includes one or more internal heat exchanger (HX) working fluid passages 182A, 182B (generally referred to as "182"). These HX working fluid passages 182 are fluidly discrete from the HX air passages 168 in that same heat exchanger 134. Each of the HX working fluid passages 182 may be partially or completely formed by the respective heat exchanger 134. Each of the HX working fluid passages 182 extends within and/or through the respective heat exchanger 134. The respective HX air passages 168 and the respective HX working fluid passages 182 may be arranged within each heat exchanger 134 to configure that heat exchanger 134 as a crossflow heat exchanger, a counterflow heat exchanger, a parallel flow heat exchanger, or a hybrid heat exchanger with a combination crossflow, counterflow and/or parallel flow arrangement.

Each heat exchanger 134 may be configured as a liquid-to-air heat exchanger (e.g., a radiator). More particularly, the working fluid flowing through (e.g., circulated within) each fluid circuit 128 and its circuit path 132 is a liquid working fluid. This liquid working fluid may function as a lubricant and/or a heat exchanging fluid. The liquid working fluid, for example, may be or otherwise include a liquid lubricant (e.g., oil) and/or a liquid coolant (e.g., refrigerant). Where the second propulsion system components 130B (see FIG. 3) are the turbine engine components, the liquid working fluid flowing through the second fluid circuit 128B may alternatively be or otherwise include a liquid fuel and/or a hydraulic fluid. In some embodiments, the first working fluid flowing through the first fluid circuit 128A may have a common composition as the second working fluid flowing through the second fluid circuit 128B. In other embodiments, to tailor heat exchange characteristics, the first working fluid flowing through the first fluid circuit 128A may have a slightly or completely different composition than the second working fluid flowing through the second fluid circuit 128B. The present disclosure, however, is not limited such an exemplary liquid-to-air heat exchanger arrangement. In other embodiments, for example, any one or both of the heat exchangers 134 (e.g., the second heat exchanger 134B) may alternatively be configured as a gas-to-air heat exchanger (e.g., an air-to-air heat exchanger) where, for example, the working fluid flowing through the respective flow circuit and its circuit path 132 is a gas such as air (e.g., compressed air bled from the core flowpath 84 (see FIG. 1) or otherwise) used for cooling the respective propulsion system components 130.

The first heat exchanger 134A of FIG. 4 is configured as a radial outer heat exchanger and is disposed radially outboard of the second heat exchanger 134B. The second heat exchanger 134B of FIG. 4 is configured as a radial inner heat exchanger and is disposed radially inboard of the second heat exchanger 134B. The present disclosure, however, is not limited to such an exemplary arranged. For example, radial positions of the first heat exchanger 134A and the second heat exchanger 134B may be reversed in other embodiments. Moreover, while the heat exchangers 134 are shown in FIG. 4 as being axially aligned along the propulsion system axis 36, it is contemplated the first heat exchanger 134A may alternatively be (e.g., slightly or completely) axially offset (a) forward and/or upstream from or (b) aft and/or downstream from the second heat exchanger 134B.

During working fluid system operation, the passage inlet 160 directs (e.g., bleeds) a quantity of the bypass air from the bypass flowpath 74 into the vane structure 140 and its structure passage 142. With the regulator elements 172A and 172B (generally referred to as "172") in their intermediate positions (see 176A, 176B), the bleed air flows from the inlet passage 164, across the heat exchangers 134 and their HX air passages 168, and into the outlet passage 166. This bleed air is subsequently exhausted from the vane structure 140 and its structure passage 142 through the passage outlet 162, for example back into the bypass flowpath 74, into an ambient environment outside of the aircraft and its aircraft propulsion system 24, or otherwise. Simultaneously with the bleed air flowing through the HX air passages 168, each working fluid circuit 128 of FIG. 3 may selectively direct (e.g., circulate) its respective working fluid through the HX working fluid passages 182 in its respective heat exchanger 134. Heat energy may thereby be transferred from the relatively hot working fluid into the relatively cool bleed air through material/a structure of the respective heat exchanger 134. This transfer of the heat energy cools the working fluid and heats the bleed air flowing through the respective heat exchanger 134.

Referring to FIG. 4, with the regulator elements 172 in their intermediate positions (see 176A, 176B), the flow of the bleed air from the inlet passage 164 into (a) the first heat exchanger 134A and its first HX air passages 168A and (b) the second heat exchanger 134B and its second HX air passages 168B may be relatively balanced and/or otherwise set to a predetermined (e.g., normal, ideal) flow split. However, under certain conditions, the first working fluid flowing through the first fluid circuit 128A may benefit from more cooling than the second working fluid flowing through the second fluid circuit 128B. Under such conditions, any one or both of the regulator elements 172 may be moved to their lower position (see 180A, 180B). With the upstream regulator element 172A in its lower position (see 180A), the upstream regulator element 172A may divert more (or all) of the bleed air away from the second heat exchanger 134B and towards the first heat exchanger 134A. With the downstream regulator element 172B in its lower position (see 180B), the downstream regulator element 172B effectively increases backpressure through the second heat exchanger 134B such that more of the bleed air will flow into the (e.g., freer-flowing) first heat exchanger 134A. Under other conditions, the second working fluid flowing through the second fluid circuit 128B may benefit from more cooling than the first working fluid flowing through the first fluid circuit 128A. Under such conditions, any one or both of the regulator elements 172 may be moved to their upper position (see 178A, 178B). With the upstream regulator element 172A in its upper position (see 178A), the upstream regulator element 172A may divert more (or all) of the bleed air away from the first heat exchanger 134A and towards the second heat exchanger 134B. With the downstream regulator element 172B in its upper position (see 178B), the downstream regulator element 172B effectively increases backpressure through the first heat exchanger 134A such that more of the bleed air will flow into the (e.g., freer-flowing) second heat exchanger 134B. The flow regulators 170 may thereby be used to tailor heat exchanger cooling for the fluid circuits 128 based on various operating parameters; e.g., working fluid temperature within the first fluid circuit 128A, working fluid temperature within the second fluid circuit 128B, etc.

While the vane structure 140 and its structure passage 142 are described above with both the upstream and the downstream flow regulators 170, the present disclosure is not limited to such an exemplary flow regulation arrangement. For example, either the upstream flow regulator 170A or the downstream flow regulator 170B may be omitted. In another example, both the upstream and the downstream flow regulators 170 may be omitted where, for example, heat exchanger cooling is primarily controlled by controlling working fluid flow through the respective heat exchanger(s) 134.

Figure 8:
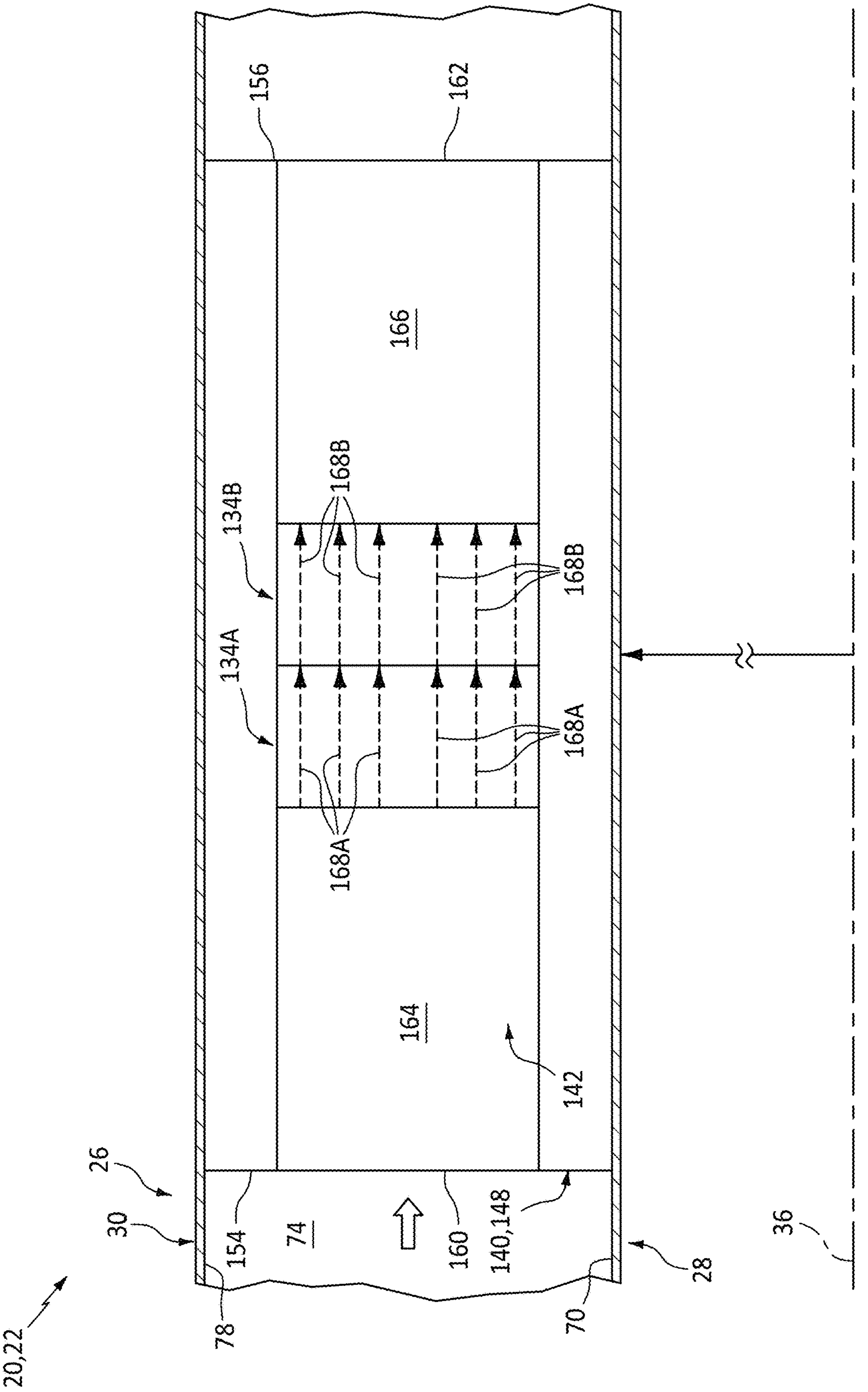
FIG. 8 is a schematic sectional illustration of a portion of the aircraft propulsion system at the vane structure with a serial arrangement of the internal heat exchangers.

In some embodiments, referring to FIG. 4, the heat exchangers 134 may be fluidly coupled in parallel between the inlet passage 164 and the outlet passage 166. In other embodiments, referring to FIG. 8, the heat exchangers 134 may be fluidly coupled in series between the inlet passage 164 and the outlet passage 166. For example, the first heat exchanger 134A may be arranged upstream of the second heat exchanger 134B along the structure passage 142, fluidly between the second heat exchanger 134B and the passage inlet 160. The second heat exchanger 134B may thereby be arranged downstream of the first heat exchanger 134A along the structure passage 142, fluidly between the first heat exchanger 134A and the passage outlet 162. Moreover, the heat exchangers 134 may be arranged with and along the structure passage 142 such that (a) substantially or completely all of the bleed air flowing along the structure passage 142 through the first heat exchanger 134A and its first HX air passages 168A is received by the second heat exchanger 134B and/or (b) substantially or completely all of the bleed air flowing along the structure passage 142 through the second heat exchanger 134B and its second HX air passages 168B is received from the first heat exchanger 134A. Of course, in other embodiments, the placement of the first heat exchanger 134A and the second heat exchanger 134B may be reversed along the structure passage 142.

Figure 9:
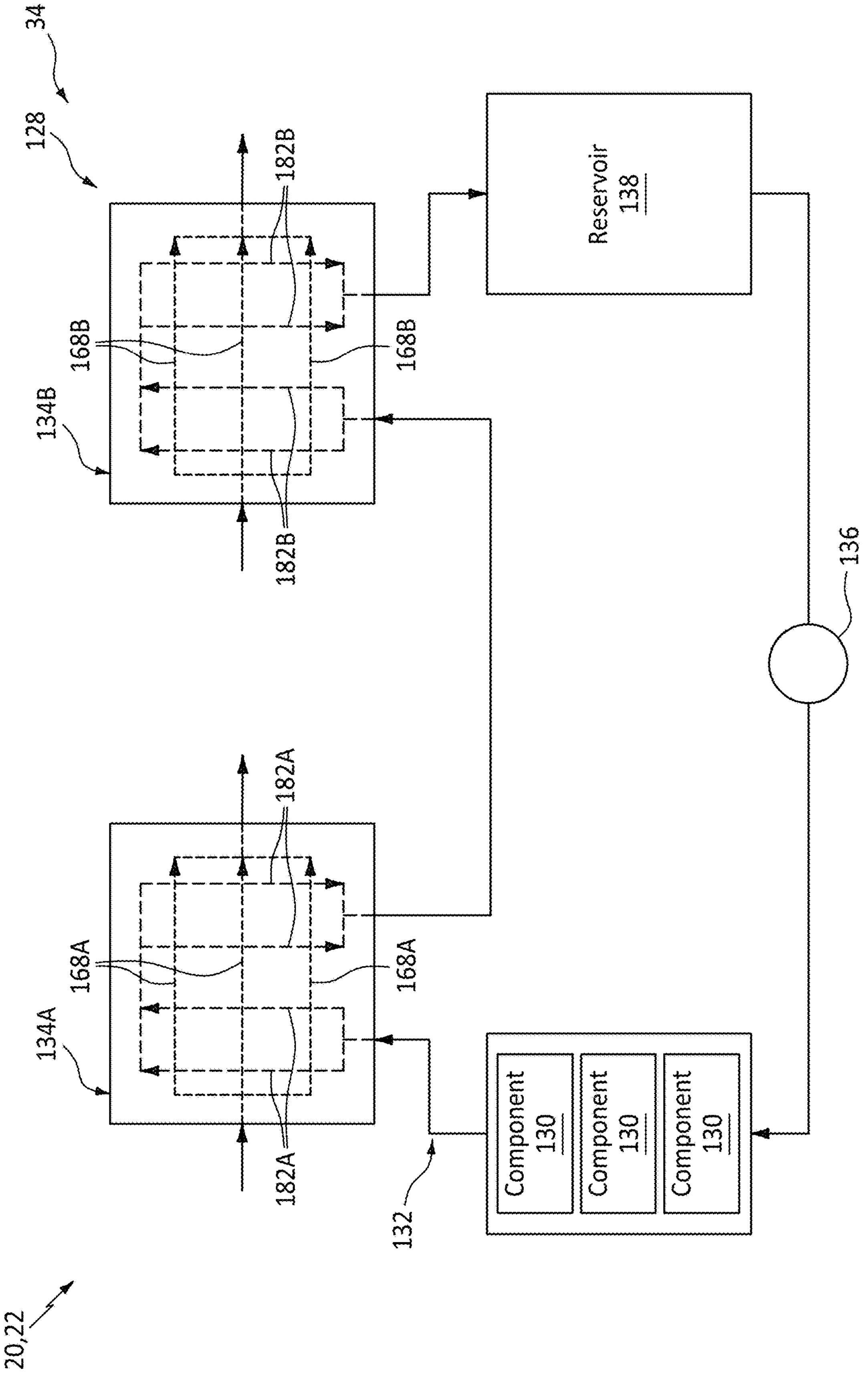
FIG. 9 is a schematic illustration of a portion of the aircraft propulsion system at the working fluid system with a single fluid circuit.

Referring to FIG. 3, while the first propulsion system components 130A are described above as being electric components and the second propulsion system components 130B are described above as being turbine engine components, the present disclosure is not limited thereto. For example, in other embodiments, the first propulsion system components 130A may be the turbine engine components and the second propulsion system components 130B may be the electric components. In another example, both the first and the second propulsion system components 130A and 130B may be the electric components where the first fluid circuit 128A services a first set of the electric components and the second fluid circuit 128B services a second set of the electric components. Moreover, while the working fluid system 34 is described above as arranging each heat exchanger 134 with a separate fluid circuit 128, it is contemplated that both heat exchangers 134A and 134B may be part of a common fluid circuit 128 that services the electric components as generally shown in FIG. 9; e.g., not the turbine engine components.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft powerplant, comprising:

a vane structure comprising a structure passage that extends internally within the vane structure from a passage inlet into the structure passage to a passage outlet out from the structure passage, the passage inlet fluidly coupling the structure passage to an external environment outside of the vane structure; a first heat exchanger disposed within the vane structure along the structure passage between the passage inlet and the passage outlet; a second heat exchanger disposed within the vane structure along the structure passage between the passage inlet and the passage outlet, the second heat exchanger spanwise offset from the first heat exchanger along a span of the vane structure; an electric machine system comprising a plurality of electric components, the plurality of electric components including a first electric machine and a first electric machine controller configured to control operation of the first electric machine, and the first electric machine configurable as at least one of an electric motor or an electric generator; and a first fluid circuit configured to cool and/or lubricate at least a first of the plurality of electric components, the first fluid circuit comprising at least one of the first heat exchanger or the second heat exchanger; and a flow diverter upstream of the first heat exchanger and the second heat exchanger along the structure passage, the flow diverter configured to selectively divert airflow to at least one of the first heat exchanger or the second heat exchanger.

2. The assembly of claim 1, further comprising:

an engine core including a rotating structure, a compressor section, a combustor section and a turbine section, the rotating structure comprising a bladed rotor disposed in one of the compressor section or the turbine section, and the rotating structure operatively coupled to a rotor of the first electric machine; and a bypass flowpath disposed outside of the engine core and comprising the external environment; the vane structure configured as a bifurcation structure extending radially across the bypass flowpath.

3. The assembly of claim 1, wherein the passage inlet is disposed at a leading edge of the vane structure in the external environment.

4. The assembly of claim 1, wherein the passage outlet is disposed at a trailing edge of the vane structure.

5. The assembly of claim 1, wherein the passage outlet further fluidly couples the structure passage to the external environment.

6. The assembly of claim 1, wherein the first heat exchanger and the second heat exchanger are arranged in parallel along the structure passage between the passage inlet and the passage outlet.

7. The assembly of claim 1, further comprising a flow regulator downstream of the first heat exchanger and the second heat exchanger along the structure passage, the flow regulator configured to regulate the airflow through at least one of the first heat exchanger or the second heat exchanger.

8. The assembly of claim 1, further comprising one or more flow regulators configured to direct equal airflow through the first heat exchanger and the second heat exchanger the one or more flow regulators comprising the flow diverter.

9. The assembly of claim 1, further comprising one or more flow regulators configured to at least one of bias more airflow through the first heat exchanger than through the second heat exchanger during a first mode; or bias more of the airflow through the second heat exchanger than through the first heat exchanger during a second mode, wherein the one or more flow regulators comprise the flow diverter.

10. The assembly of claim 1, wherein the first fluid circuit comprises the first heat exchanger and the second heat exchanger.

11. The assembly of claim 1, further comprising:
a second fluid circuit discrete from the first fluid circuit; the first fluid circuit comprising the first heat exchanger; and the second fluid circuit comprising the second heat exchanger.

12. The assembly of claim 11, wherein the second fluid circuit is configured to cool and/or lubricate one or more powerplant components independent of the electric machine system.

13. The assembly of claim 1, wherein the aircraft powerplant comprises a turbofan propulsion system.

14. The assembly of claim 1, further comprising:
an engine core including a rotating structure, a compressor section, a combustor section and a turbine section; the rotating structure comprising a bladed rotor disposed in the compressor section or the turbine section, and the rotating structure configured to rotate about an axis; and the span of the vane structure extending radially relative to the axis such that the second heat exchanger is radially offset from the first heat exchanger relative to the axis.

15. The assembly of claim 14, wherein the first heat exchanger is offset radially outward of the second heat exchanger.

16. An assembly for an aircraft powerplant, comprising:
an engine core including a compressor section, a combustor section and a turbine section;
a bypass flowpath disposed outside of the engine core;
a bifurcation structure extending radially across the bypass flowpath, the bifurcation structure comprising a structure passage that extends through the bifurcation structure from a passage inlet into the structure passage to a passage outlet out from the structure passage, and the passage inlet fluidly coupling the structure passage to the bypass flowpath; a first heat exchanger disposed within the bifurcation structure along the structure passage between the passage inlet and the passage outlet; a second heat exchanger disposed within the bifurcation structure along the structure passage between the passage inlet and the passage outlet; and a flow diverter upstream of the first heat exchanger and the second heat exchanger along the structure passage, the flow diverter configured to selectively divert airflow to at least one of the first heat exchanger or the second heat exchanger, and the flow diverter disposed at a location within the bifurcation structure radially between the first heat exchanger and the second heat exchanger.

17. The assembly of claim 16, further comprising:
an electric machine system comprising a plurality of electric components, the plurality of electric components comprising a first electric machine and a first electric machine controller electrically coupled to the first electric machine; and a first fluid circuit configured to cool and/or lubricate at least a first of the plurality of electric components, the first fluid circuit comprising at least one of the first heat exchanger or the second heat exchanger.

18. An assembly for an aircraft powerplant, comprising:
a rotating structure configured to rotate about an axis, the rotating structure comprises a bladed compressor rotor and a bladed turbine rotor; a vane structure extending radially from an inner vane structure end to an outer vane structure end, the vane structure comprising a structure passage that extends internally within the vane structure from a passage inlet into the structure passage to a passage outlet out from the structure passage, the passage inlet fluidly coupling the structure passage to an external environment outside of the vane structure; a first heat exchanger disposed within the vane structure along the structure passage between the passage inlet and the passage outlet; a second heat exchanger disposed within the vane structure along the structure passage between the passage inlet and the passage outlet, the second heat exchanger disposed radially below the first heat exchanger; an electric machine system comprising a plurality of electric components, the plurality of electric components including a first electric machine and a first electric machine controller configured to control operation of the first electric machine, and the first electric machine configurable as at least one of an electric motor or an electric generator; and
a first fluid circuit configured to cool and/or lubricate at least a first of the plurality of electric components, the first fluid circuit comprising at least one of the first heat exchanger or the second heat exchanger, and a flow diverter upstream of the first heat exchanger and the second heat exchanger along the structure passage, the flow diverter configured to selectively divert airflow to at least one of the first heat exchanger or the second heat exchanger.

* * * * *